2,978,462
DERIVATIVES OF 3'-METHYL-SPIRO (2H-1-BETA-NAPHTHOPYRAN-2,2'-[2'H-1' BENZOPYRAN])

Elliot Berman and David B. McQuain, Dayton, Ohio, assignors to The National Cash Register Company, Dayton, Ohio, a corporation of Maryland No Drawing. Filed June 19, 1959, Ser. No. 821,383

1 Claim. (Cl. 260—345.2)

This invention relates to derivatives of 3'-methyl-spiro (2H-1-betanaphthopyran-2,2'[2'H-1'benzopyran]) having the structure

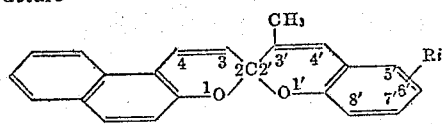

in which the algebraic sum of the values of substituents "$i$" taken from Table I, which gives the positive or negative effective value of a substituent "$i$" on the 2'-1'spiro-carbon to oxygen bond in different ring positions, is positive:

TABLE I
*Ring positions*

| | $i$ | 8' | 5';7' | 6' |
|---|---|---|---|---|
| (1) | zero | 0.00 | 0.00 | 0.00 |
| (2) | $CH_3$ | −0.17 | −0.069 | −0.306 |
| (3) | $CH_2CH_3$ | −0.16 | −0.0625 | −0.291 |
| (4) | $CH(CH_3)_2$ | −0.15 | −0.0559 | −0.276 |
| (5) | $C(CH_3)_3$ | −0.14 | −0.0581 | −0.260 |
| (6) | $C_6H_5$ | 0.00 | +0.05 | −0.01 |
| (7) | $CF_3$ | | +0.43 | +0.54 |
| (8) | $CN$ | | +0.56 | +0.66 |
| (9) | $COCH_3$ | | +0.376 | +0.502 |
| (10) | $CO_2C_2H_5$ | | +0.37 | +0.45 |
| (11) | $CO_2H$ | | +0.37 | +0.45 |
| (12) | $NH_2$ | | −0.16 | −0.66 |
| (13) | $NHCH_3$ | | | −0.84 |
| (14) | $N(CH_3)_2$ | | | −0.83 |
| (15) | $NHCOCH_3$ | | +0.21 | 0.0 |
| (16) | $N(CH_3)_3+$ | | +0.88 | +0.82 |
| (17) | $NO_2$ | +0.80 | +0.662 | +0.777 |
| (18) | $PO_3H$ | | +0.2 | +0.26 |
| (19) | $OCH_3$ | −0.39 | +0.0465 | −0.764 |
| (20) | $OC_2H_5$ | −0.35 | +0.1 | −0.24 |
| (21) | $O(CH_2)_2CH_3$ | | +0.1 | −0.25 |
| (22) | $O(C_6H_5)$ | | +0.252 | −0.32 |
| (23) | $OH$ | | +0.121 | −0.37 |
| (24) | $OCOCH_3$ | | +0.39 | +0.31 |
| (25) | $SCH_3$ | | +0.15 | 0.0 |
| (26) | $SH$ | | +0.25 | +0.15 |
| (27) | $SCOCH_3$ | | +0.39 | +0.44 |
| (28) | $SCN$ | | | +0.52 |
| (29) | $SOCH_3$ | | +0.52 | +0.49 |
| (30) | $SO_2CH_3$ | | +0.60 | +0.72 |
| (31) | $SO_2NH_2$ | | +0.46 | +0.57 |
| (32) | $S(CH_3)_2+$ | | +1.00 | +0.90 |
| (33) | $F$ | +0.24 | +0.337 | −0.0714 |
| (34) | $Cl$ | +0.20 | +0.373 | +0.112 |
| (35) | $Br$ | +0.21 | +0.391 | +0.148 |
| (36) | $I$ | +0.21 | +0.352 | +0.132 |
| (37) | $IO_2$ | | +0.70 | +0.76 |
| (38) | $CH_2CH=CH_2$ | −0.16 | −0.0625 | −0.291 |
| (39) | $CO_2CH_3$ | +0.45 | +0.37 | +0.45 |

These derivative compounds, as well as the unsubstituted parent compound, which is known, have two color-absorption states, a colorless state, in which the 2'-1' spiro-carbon to oxygen bond is intact, and a colored state, in which such bond is broken. These compounds are crystalline solids at room temperature and exhibit a light yellowish color in the colorless state and an orange-red color in the colored state. In liquid solution, the compounds in the colorless state have no substantial color, but in the colored state appear red-orange in ethanol and red in toluene.

The parent compound

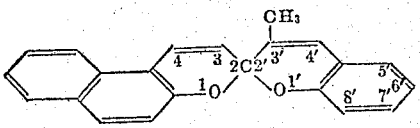

with which this invention is not concerned, and the derivatives thereof which are claimed herein, all have the property of being converted, in solution, from the colored state to the colorless state when subjected to electromagnetic radiation predominating in visible components and reversely convertible from the colorless state to the colored state when subjected to electromagnetic radiation predominating in ultraviolet components.

This characteristic of the compounds, of being switchable from one color-absorption state to another, is useful in many ways where the colored or uncolored state is to be visually or instrumentally sensed. One important use of such compounds, in solution, is as a component of a data recording and erasing system, the data being indicated by one light-absorption state or the other. Droplets of a liquid solution of such compounds may be contained in microscopic capsules made according to the disclosure in the Green and Schleicher U.S. Patent 2,800,457, which issued July 23, 1957, the walls of which capsules transmit the color-change-provoking radiation. Such capsules disposed on a surface may be switched from one light absorption condition to the other, in selected areas, to indicate, by the presence of color or not, the presence or absence of data. The use of such capsules in a data-storage system is disclosed in the application for U.S. Letters Patent of Elliot Berman, Serial No. 654,578, which was filed on April 23, 1957.

The parent compound, which, as has been said, is known, is inferior to the claimed derivative compounds in that it is thermo-unstable in the colored condition at moderate temperatures, and will revert to the colorless condition without provoking radiation, unless it is kept at a temperature near minus 60 degrees centigrade. For practical use, such temperatures are intolerable.

The novel derivative compounds encompassed by this invention are stable at temperatures ranging from minus 10 degrees centigrade to as high as 100 degrees centigrade and, thus, these derivative compounds are of considerable economic importance because they can be used at workable temperatures.

As a preferred embodiment of the invention, the 6'-nitro derivative, having the structure

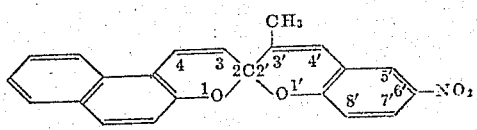

is chosen because, among others, it is reversible, in solution, from one color-absorption condition to the other, at room temperature (22 degrees centigrade) and is stable, colorwise, in either the colorless or the colored state at such temperature. In making the preferred compound, 5-nitrosalicylaldehyde is condensed with methyl ethyl ketone as follows:

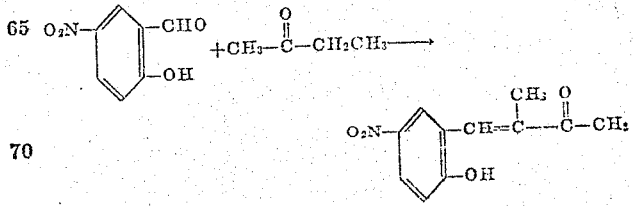

and this reaction product is condensed with 2-hydroxy-1-naphthaldehyde followed by spiran formation as follows:

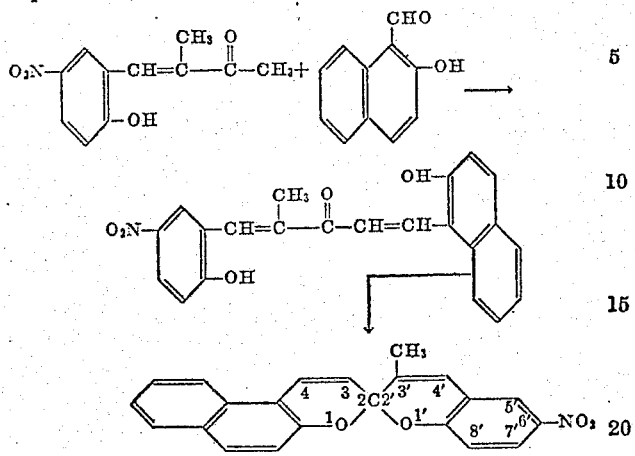

Following is a specific exemplary preparation. In a 50 milliliter Erlenmeyer flask is placed 5.4 grams (0.033 mole) of 5-nitrosalicylaldehyde, 2.4 grams (0.033 mole) of methyl ethyl ketone, and 12 milliliters of glacial acetic acid. The solution is cooled to 5 degrees centigrade in an ice-water bath, with hydrogen chloride bubbled through the solution for one hour. The resultant reaction mixture is allowed to stand for several hours. A solution of 5.8 grams (0.033 mole) of 2-hydroxy-1-naphthaldehyde in 15 milliliters of glacial acetic acid then is added to the reaction mixture and hydrogen chloride is bubbled through it for one hour. The reaction mixture is allowed to stand several hours, at room temperature (22 degrees centigrade). Thereafter, ethyl ether is gradually added to the last reaction mixture to form a green precipitate which is removed by suction filtration, washed several times with ethyl ether, and shaken in an ethanol suspension of sodium acetate until the color is discharged. The ether layer is separated out and the ether removed in a steam bath, yielding a pale yellow-green residue which is recrystallized several times from acetone to give the desired product in the colorless form. The compound has a melting point of 209–210 degrees centigrade.

All of the starting ingredients are known and are commercially available.

OTHER EXAMPLES

All other derivatives may be made by the same procedure, varied only in the selection of substituents in the salicylaldehyde, taking care that the algebraic sum of their ring position values in the final compound is always positive. It is, of course, understood that two or more sterically incompatible substituents cannot be used.

The selected substituted salicylaldehyde components are easily made by well known procedures.

What is claimed is:

The 6'-nitro derivative of 3'-methyl-spiro(2H-1-beta-naphthopyran-2,2'[2'H-1' benzopyran]) having the structure

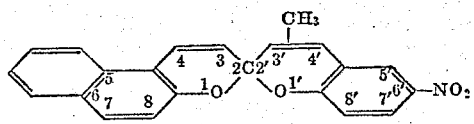

References Cited in the file of this patent
Mustafa: Chemical Reivews, vol. 43, (1948), p. 515.